US00RE50087E

(19) United States
(12) Reissued Patent
Moon et al.

(10) Patent Number: US RE50,087 E
(45) Date of Reissued Patent: Aug. 20, 2024

(54) COMPRESSOR HAVING ROUND PART PLACED NEAR OUTLET PORT

(71) Applicant: LG Electronics Inc., Seoul (KR)

(72) Inventors: Seokhwan Moon, Seoul (KR); Seoung-Min Kang, Seoul (KR); Kiyoul Noh, Seoul (KR)

(73) Assignee: LG ELECTRONICS INC., Seoul (KR)

(21) Appl. No.: 17/673,724

(22) Filed: Feb. 16, 2022

Related U.S. Patent Documents

Reissue of:
(64) Patent No.: 10,989,197
Issued: Apr. 27, 2021
Appl. No.: 16/010,687
Filed: Jun. 18, 2018

(30) Foreign Application Priority Data

Jun. 22, 2017 (KR) ..... 10-2017-0079190

(51) Int. Cl.
*F04C 29/12* (2006.01)
*F04C 18/344* (2006.01)

(52) U.S. Cl.
CPC ..... *F04C 29/124* (2013.01); *F04C 18/3442* (2013.01); *F04C 29/128* (2013.01); *F04C 2240/30* (2013.01)

(58) Field of Classification Search
CPC .. F04C 29/124; F04C 29/128; F04C 18/3442; F04C 2240/30
See application file for complete search history.

(56) References Cited

U.S. PATENT DOCUMENTS 4,076,047 A * 2/1978 Akahori ..... F16K 15/144 137/856
4,580,604 A * 4/1986 Kawaguchi ..... F16K 15/144 137/856
4,955,797 A * 9/1990 Cowen ..... F16K 15/144 137/856

(Continued)

FOREIGN PATENT DOCUMENTS

JP 5828863 B2 12/2015
KR 20-1987-0001339 Y1 4/1987

(Continued)

OTHER PUBLICATIONS

International Search Report, dated Oct. 16, 2018, issued in PCT/KR2018/006808 (14 pages).

*Primary Examiner* — William E Dondero
(74) *Attorney, Agent, or Firm* — Birch, Stewart, Kolasch & Birch, LLP

(57) ABSTRACT

The present disclosure provides a compressor including a rounded portion surrounding a discharge port, including a cylinder without an oil-blocking structure for ease of shaping the rounded portion, and including a valve-recess cover coupled to the cylinder. At least one valve-recess is defined in an outer face portion of the cylinder. A discharge valve assembly is fixedly received in the valve-recess, wherein the discharge valve assembly is configured for opening and closing the discharge port. The valve-recess is defined between the outer face, primary and secondary side blocks. The rounded portion surrounds the discharge port, to reduce a contact area between the discharge port and the valve assembly.

17 Claims, 8 Drawing Sheets

(56) References Cited

U.S. PATENT DOCUMENTS

| | | | | |
|---|---|---|---|---|
| 4,966,531 | A * | 10/1990 | Suzuki | F04C 28/14 417/310 |
| 8,979,517 | B2 * | 3/2015 | Omura | F04C 18/332 418/11 |
| 2015/0147216 | A1 * | 5/2015 | Shimaguchi | F04C 29/12 418/15 |
| 2015/0377237 | A1 * | 12/2015 | Kim | F04C 29/12 418/15 |
| 2016/0333877 | A1 * | 11/2016 | Tsuda | F04C 29/0064 |
| 2017/0030353 | A1 * | 2/2017 | Nagano | F04C 29/026 418/110 |

FOREIGN PATENT DOCUMENTS

| | | | |
|---|---|---|---|
| KR | 10-2005-0040424 | A | 5/2005 |
| KR | 10-2013-0094651 | A | 8/2013 |
| KR | 10-2016-0001467 | A | 1/2016 |
| KR | 10-2016-0038840 | A | 4/2016 |

* cited by examiner

COMPRESSOR HAVING ROUND PART PLACED NEAR OUTLET PORT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the priority of Korean Patent Application No. 10-2017-0079190 filed on Jun. 22, 2017, in the Korean Intellectual Property Office, the disclosure of which is hereby incorporated by reference in its entirety.

BACKGROUND

1. Technical Field

The present disclosure relates to a compressor including a rounded portion surrounding a discharge port, including a cylinder without an oil-blocking structure for ease of shaping the rounded portion, and including a valve-recess cover removably coupled to the cylinder.

2. Description of the Related Art

Generally, a compressor is applied to a vapor compression-based refrigeration cycle (hereinafter, refrigeration cycle) as employed, for example, in a refrigerator or an air conditioner, etc.

The compressor may be classified into vane type, reciprocating type, rotary type, and scroll type compressors depending on how refrigerant is compressed.

In the vane rotary compressor, a roller is disposed in a compression chamber. The roller is eccentric with an inner circumferential face of a cylinder. The roller is configured to rotate to allow a volume of the compression chamber to vary. The roller has a plurality of slots defined therein. A plurality of vanes is moveably inserted in the slots respectively. The rotation of the roller allows the vanes to move toward an inner circumferential face of the cylinder to divide the compression chamber into a plurality of compression sub-chambers.

The inner circumferential face of the cylinder may be formed in a circular shape. In recent years, however, the inner circumferential face of the cylinder may be formed into an ellipse or a combination of an ellipse and a circle. In a latter case, the vane rotary compressor has a hybrid cylinder to increase a compression efficiency while reducing friction loss.

The cylinder of the vane rotary compressor may be placed between a primary lateral block and a secondary lateral block. Further, the cylinder has a plurality of discharge ports defined therein.

An oil-blocking structure may be formed adjacent the discharge port to prevent oil from entering the discharge port. Further, on the discharge port, a discharge valve for opening and closing the discharge port may be provided.

In this connection, when a contact area between the discharge port and the discharge valve increases, oil stiction due to oil may increase. When the oil stiction due to oil increases, power loss due to over-compression may occur during the compressor operation.

To solve this problem, a rounded portion may be provided around the discharge port, to reduce the contact area between the discharge port and the discharge valve.

However, when the oil-blocking structure exists on the outer circumferential face of the cylinder, workability of the rounded portion may be reduced.

Further, in order to improve the workability of the rounded portion, the oil-blocking structure may be removed. However, in this case, there is a problem that the oil flows into a discharge chamber communicating with the discharge port, thereby to prevent the refrigerant from being discharged therethrough.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

A purpose of the present disclosure is to provide a compressor in which a rounded portion that reduces a contact area between the discharge port and the discharge valve may be easily machined around the discharge port by removing the oil-blocking structure existing on the outer circumferential face of the cylinder in the prior art.

Another purpose of the present disclosure is to provide a compressor in which a valve-recess cover is coupled to the outer surface of the cylinder, and, thus, the oil-blocking structure existing on the outer circumferential face of the cylinder in the prior art, is removed, thereby preventing the oil from being introduced into the discharge chamber.

The purposes of the present disclosure are not limited to the above-mentioned purposes. Other purposes and advantages of the present disclosure, as not mentioned above, may be understood from the following descriptions and more clearly understood from the embodiments of the present disclosure. Further, it will be readily appreciated that the objects and advantages of the present disclosure may be realized by features and combinations thereof as disclosed in the claims.

In a first aspect of the present disclosure, there is provided a cylinder having a compression chamber defined therein, wherein the cylinder has suction and discharge ports defined therein, wherein the suction and discharge ports is opposite to each other; a roller disposed in the compression chamber, wherein the roller is eccentric with an inner circumferential face of the cylinder, wherein the roller is configured to rotate to allow a volume of the compression chamber to vary; a plurality of vanes moveably inserted in the roller, wherein the rotation of the roller allows the vanes to move toward the inner circumferential face of the cylinder to divide the compression chamber into a plurality of compression sub-chambers; at least one valve-recess defined in an outer face portion of the cylinder; and a discharge valve assembly fixedly received in the valve-recess, wherein the discharge valve assembly is configured for opening and closing the discharge port, wherein an outer face portion of the cylinder defining the valve-recess includes: a valve-seated portion; a step portion protruding from the valve-seated portion, wherein one end of the discharge valve assembly is fixed to the step portion; and a rounded portion surrounding the discharge port, wherein the rounded portion protrudes from the valve-seated portion.

In a second aspect of the present disclosure, there is provided a compressor comprising: a cylinder having a compression chamber defined therein, wherein the cylinder has suction and discharge ports defined therein, wherein the suction and discharge ports is opposite to each other; a roller disposed in the compression chamber, wherein the roller is eccentric with an inner circumferential face of the cylinder, wherein the roller is configured to rotate to allow a volume of the compression chamber to vary; a plurality of vanes moveably inserted in the roller, wherein the rotation of the roller allows the vanes to move toward the inner circumferential face of the cylinder to divide the compression chamber into a plurality of compression sub-chambers; at least one valve-recess defined in an outer face portion of the cylinder, wherein the valve-recess communicates with the discharge port; a discharge valve assembly fixedly received in the valve-recess, wherein the discharge valve assembly is configured for opening and closing the discharge port; and a valve-recess cover coupled to the cylinder to cover the valve-recess, wherein the cover has a curvature center coinciding with a curvature center of the cylinder.

In a third aspect of the present disclosure, there is provided a compressor comprising: a casing; a drive motor housed in the casing; a rotatable shaft constructed to transmit a rotation force to a roller; primary and secondary side blocks housed in and fixed to the casing, wherein the primary and secondary side blocks are spacedly arranged along and surround the rotatable shaft; a cylinder interposed between and fixed to the primary and secondary side blocks, wherein the cylinder has a compression chamber defined therein, wherein the cylinder has suction and discharge ports defined therein, wherein the suction and discharge ports is opposite to each other; a roller disposed in the compression chamber, wherein the roller is eccentric with an inner circumferential face of the cylinder, wherein the roller is configured to rotate to allow a volume of the compression chamber to vary, wherein the roller has a plurality of slots defined therein; a plurality of vanes moveably inserted in the roller, wherein the rotation of the roller allows the vanes to move toward the inner circumferential face of the cylinder to divide the compression chamber into a plurality of compression sub-chambers; at least one valve-recess defined in an outer face portion of the cylinder; and a discharge valve assembly fixedly received in the valve-recess, wherein the discharge valve assembly is configured for opening and closing the discharge port, wherein the valve-recess is defined by an outer face of the cylinder, and the primary and secondary side blocks.

In accordance with the present disclosure, the rounded portion that reduces a contact area between the discharge port and the discharge valve may be easily machined around the discharge port by removing the oil-blocking structure existing on the outer circumferential face of the cylinder in the prior art. Thus, the cost and time required for machining the rounded portion may be saved.

Further, in accordance with the present disclosure, the rounded portion reduces the oil stiction occurring between the discharge port and the discharge valve assembly. Thus, it is possible to reduce the power loss due to over-compression of the compressing unit. As a result, the overall efficiency of the compressor may be improved.

Furthermore, the oil-blocking structure existing on the outer circumferential face of the cylinder in the prior art is removed according to the present invention. As a result, oil inflow into the discharge chambers may occur. However, this may be prevented by coupling the valve-recess cover into the cylinder. Thus, in the compressor according to an embodiment of the present disclosure, the compressed refrigerant may be smoothly discharged to the outside by coupling the valve-recess cover on the outer face of the cylinder.

DETAILED DESCRIPTIONS

Figure 1:
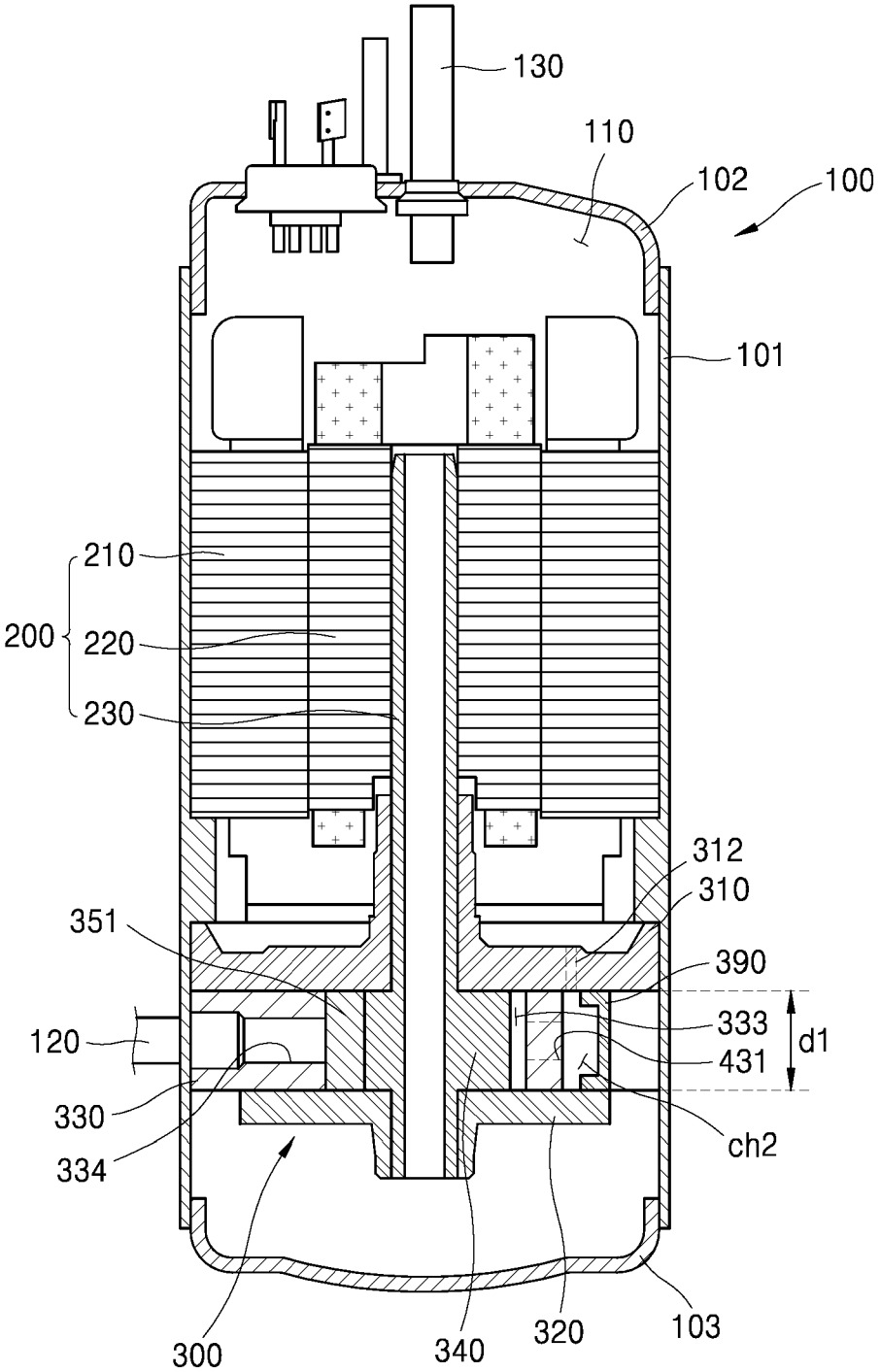
FIG. 1 is a cross-sectional view of a compressor according to an embodiment of the present disclosure.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Spatially relative terms, such as "beneath," "below," "lower," "under," "above," "upper," and the like, may be used herein for ease of explanation to describe one element or feature's relationship to another element or feature as illustrated in the figures. It will be understood that the spatially relative terms are intended to encompass different orientations of the compressor in use or in operation, in addition to the orientation depicted in the figures. For example, if the compressor in the figures is turned over, elements described as "below" or "beneath" or "under" other elements or features would then be oriented "above" the other elements or features. Thus, the example terms "below" and "under" can encompass both an orientation of above and below. The compressor may be otherwise oriented for example, rotated 90 degrees or at other orientations, and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Hereinafter, a compressor according to an embodiment of the present disclosure will be described with reference to FIGS. 1 to 8.

Figure 2:
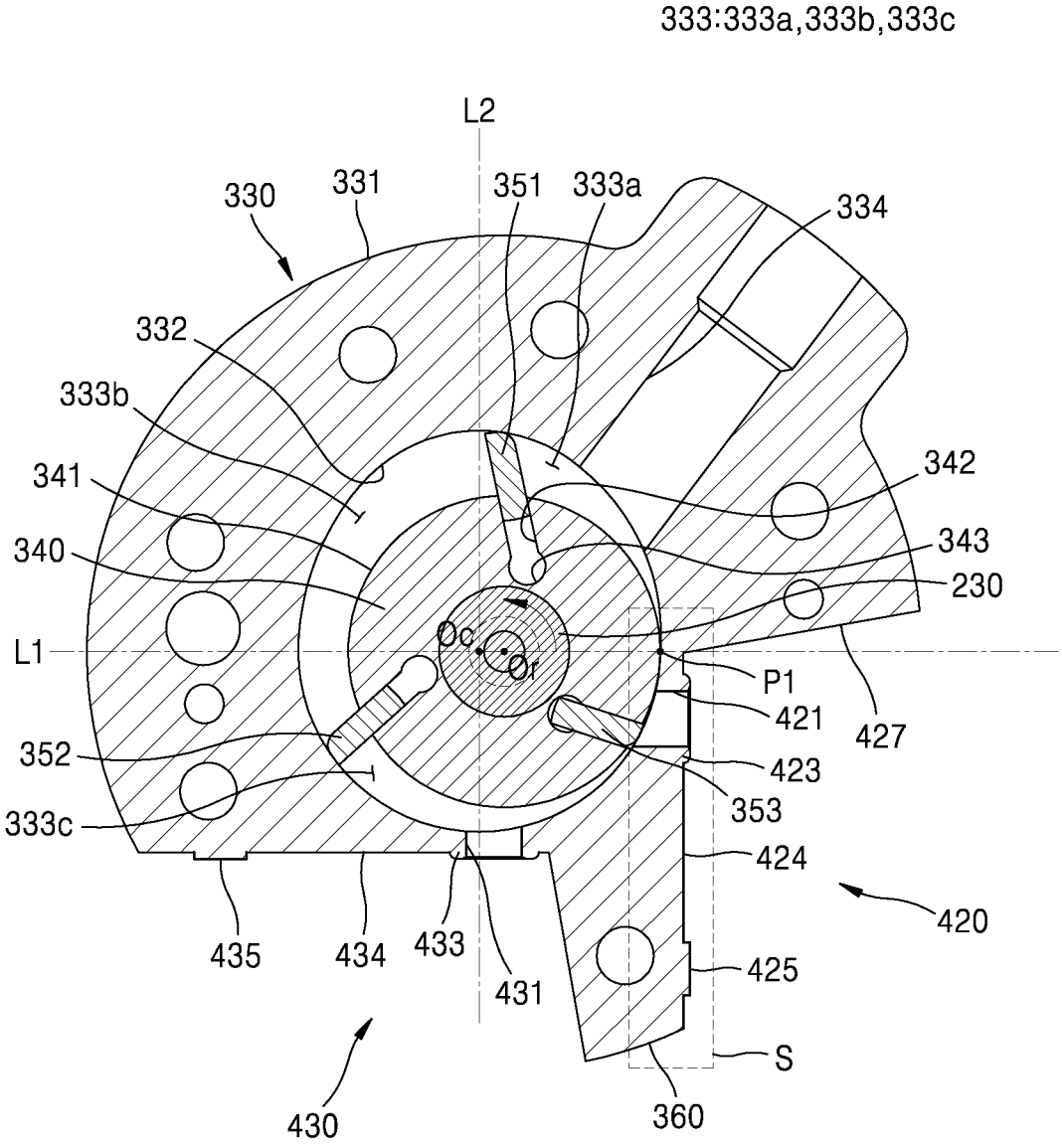
FIG. 2 is a cross-sectional view of a cylinder included in the compressor of FIG. 1.

FIG. 1 is a cross-sectional view of a compressor according to an embodiment of the present disclosure. FIG. 2 is a cross-sectional view of a cylinder included in the compressor of FIG. 1.

FIG. 1 and FIG. 2, the compressor according to the present disclosure includes a casing 100 having an inner space defined therein, a drive motor 200 provided in an upper portion of the inner space, a compressing unit 300 disposed under the drive motor 200, and a rotatable shaft 230 for transferring a driving force from the motor 230 to the compressing unit 300.

The casing 100 may be, for example, in the shape of a cylinder, so that the casing 100 may include a hollow cylindrical body 101.

Further, a top shell 102 is installed on a top of the hollow cylindrical body 101, while a bottom shell 102 may be installed on a bottom of the hollow cylindrical body 101. The top and bottom shells 102 and 103 are, for example, welded to the hollow cylindrical body 101, thereby defining the inner space within the casing.

In this connection, the top shell 102 may be provided with a discharge tube 130. The discharge tube 130 is a passage through which the compressed refrigerant discharged from the compressing unit 300 is discharged to the outside.

For reference, an oil separator (not shown) may be connected to the discharge tube 130 to separate oil contained in the discharged refrigerant therefrom.

The drive motor 200 is installed in the inner space of the casing 100. Under the drive motor 200, a compressing unit 300 is installed. The compressing unit 300 receives the rotational force generated by the drive motor 200 via the rotatable shaft 230.

The compressor may be classified into an upper compression type compressor or a lower compression type compressor depending on the positions of the compressing unit 300 and the drive motor 200. In the upper compression type compressor, the compressing unit 300 is located above the drive motor 200. In the lower compression type compressor, the compressing unit 300 is located below the drive motor 200.

Although the drawings illustrate that the compressor according to an embodiment of the present disclosure is the lower compression type compressor, the present disclosure is not limited thereto. The compressor according to the embodiment of the present disclosure may be implemented as an upper compression type compressor. Alternatively, the compressing unit 300 and the drive motor 200 may be arranged in the lateral direction.

The drive motor 200 includes a stator 210 fixed to the inner face of the casing 100, and a rotor 220 positioned inside stator 210 and rotatable by interaction with the stator 210. The rotatable shaft 230 is fixed to the center of the rotor 220. The rotor 220 and the rotatable shaft 230 rotate together.

The compressing unit 300 may be disposed on one side of the drive motor 200.

The compressing unit 300 includes a primary lateral block 310, a cylinder 330 and a secondary lateral block 320 installed along the axial direction of the rotatable shaft 230.

The primary lateral block 310 may be fixed to the inner circumferential face of the casing 100. The cylinder 330 may be fixed to the bottom face of the primary lateral block 310. Further, the secondary lateral block 320 may be fixed to the bottom face of the cylinder 330.

That is, the cylinder 330 may be disposed between the primary lateral block 310 and the secondary lateral block 320. In this connection, the primary lateral block 310 and the secondary lateral block 320 block the open top face and bottom face of the cylinder 330 to define a compressing space 333 within the cylinder 330.

In this connection, the cylinder 330 may be bolted to the primary lateral block 310 and the secondary lateral block 320. However, the present disclosure is not limited to this bolt-based fastening.

Although the diameter of the primary lateral block 310 is larger than the diameter of the secondary lateral block 320 as shown in FIG. 1. the present disclosure is not limited thereto. For example, like the primary lateral block 310, the secondary lateral block 320 may be fixed to the casing 100. The secondary lateral block 320 may be formed to have the same diameter as that of the primary lateral block 310.

A compressing space 333 is defined in the cylinder 330 by the primary lateral block 310 and the secondary lateral block 320 installed on both sides of the cylinder 330 respectively.

An inner circumferential face 332 of the cylinder 330 is formed in a circular or oval shape. Alternatively, the inner circumferential face 332 of the cylinder 330 may be formed into a symmetrical elliptical shape or an asymmetric elliptical shape.

The asymmetric elliptical cylinder 330 is commonly referred to as a hybrid cylinder. Hereinafter, the present disclosure will be illustrated based on a configuration wherein the inner circumferential face of the cylinder 330 is formed as an asymmetric elliptical shape.

Referring to FIG. 2, the outer circumferential face 331 of the cylinder 330 may be formed in a circular shape. However, the present disclosure is not limited to this circular shape. In one embodiment, even when the outer circumferential face 331 is non-circular, the non-circular shape may be sufficient as long as the cylinder may be secured to the inner circumferential face of the casing 100.

A hollow space is defined at the center of the cylinder 330. This hollow space is sealed by the primary lateral block 310 and the secondary lateral block 320 to define the compressing space 333. In the compressing space 333, a roller 340 as described later may be rotatably disposed.

A suction port 334 and discharge ports 421 and 431 are defined in the inner circumferential face 332 of the cylinder 330. The suction port 334 and discharge ports 421 and 431 are defined around the point P1 at which the inner circumferential face 332 of the cylinder 330 and the outer circumferential face 341 of the roller 340 are substantially in contact with. That is, the suction port 334 is opposite to the discharge ports 421 and 431 with the point P1 being positioned therebetween. Further, the two discharge ports 421 and 431 are defined in an opposite region to the suction port 334 region. The point P1 divides the inner circumferential face into the discharge port region and suction portion region or into the discharge region or suction region.

The suction port 334 is connected to the suction tube 120 passing through the casing 100.

The discharge ports 421 and 431 are in communication with the inner space 110 of the casing 100 and indirectly with the discharge tube 130 which is communicatively connected to the upper portion of the casing 100.

Thus, the refrigerant may be sucked directly into the compressing space 333 via the suction port 334, whereas, the compressed refrigerant may be discharged to the inner space 110 of the casing 100 via discharge ports 421 and 431 and then discharged through the discharge tube 130.

Accordingly, the inner space 110 of the casing 100 may be maintained at a high-pressure state forming the discharge pressure.

Further, a separate suction valve may not be installed in the suction port 334, while a discharge valve assembly (500 in FIG. 5) for groove and closing the discharge ports 421 and 431 may be installed in each of the discharge ports 421 and 431.

The discharge valve assembly (500 in FIG. 5) may be a lead type valve structure with one fixed end and the other free end. However, the present disclosure is not limited to this. The discharge valve assembly (500 of FIG. 5) may vary as needed. In on example, in addition to or as an alternative to the lead type valve structure, a piston valve structure may be used.

Hereinafter, the present invention will be described based on an example in which the discharge valve assembly (500 shown in FIG. 5) is formed of a lead type valve structure. Further, a detailed description of the discharge valve assembly (500 in FIG. 5) will be described later with reference to FIG. 5.

Figure 5:
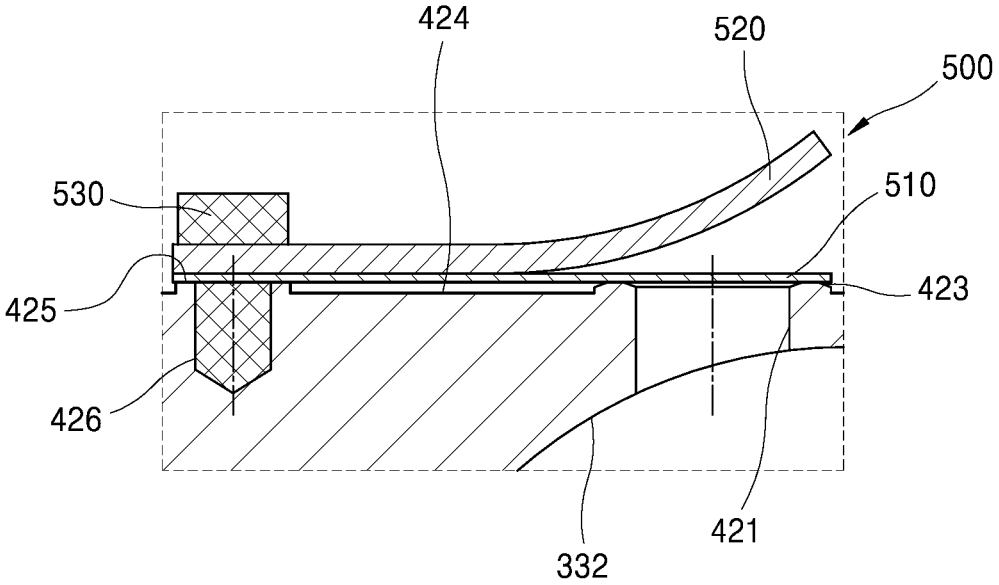
FIG. 5 shows a discharge valve assembly coupled to the cylinder of FIG. 4.

In the outer circumferential face portion of the cylinder 330, there are defined valve-recesses 420 and 430, which respectively accommodate therein the discharge valve assemblies (500 of FIG. 5).

The valve-recesses 420 and 430 may allow one end of each of the discharge ports 421 and 431 to be exposed.

A plurality (two in FIG. 2) of valve-recesses 420 and 430 may be provided. However, the present disclosure is not limited thereto. In one embodiment, only a single valve-recess is defined.

The valve-recesses 420 and 430 are valve-recessed in the outer surface portion of the cylinder 330, thereby reducing the channel length of each of the discharge ports 421 and 431.

Accordingly, the channel length of each of the discharge ports 421 and 431 may be reduced to a minimum. This may reduce a dead volume generated by the discharge ports 421 and 431 (i.e., the volume wasted by the discharge ports 421 and 431).

Each of the valve-recesses 420 and 430 may be defined in a triangular shape to define each of flat valve-seated portions 424 and 434 that have been valve-recessed via etching inward of the cylinder 330. However, the present disclosure is not limited thereto. In another embodiment, the valve-recesses 420 and 430 may be defined as a polygonal or curved shape.

Specifically, the cylinder 330 may include a first valve-recess 420 and a second valve-recess 430 as defined in its outer surface portion. In this connection, the first valve-recess 420 may be disposed adjacent to the suction port 334 rather than the second valve-recess 430.

Further, a first valve-seated flat portion 424 on the first valve-recess 420 and a second valve-seated flat portion 434 on the second valve-recess 430 may extend in a perpendicular manner to each other. However, the present disclosure is not limited thereto.

In this connection, the first valve-recess 420 may have substantially the same structure as that of the second valve-recess 430. A detailed description of the first valve-recess 420 and the second valve-recess 430 will be given later with reference to FIGS. 3 and 4.

The plurality of discharge ports 421 and 431 may be defined along a compression path (in compression progress direction). Hereinafter, for the sake of convenience, the discharge port located at the upstream side of the compression path is referred to as a secondary discharge port 431, while the discharge port located at the downstream side of the compression path is referred to as a primary discharge port 421.

In this connection, the secondary discharge port 431 may be not necessarily required, but may be optional or may be defined as necessary.

For example, if a compression interval along the inner circumferential face 332 of the cylinder 330 is elongated and thus over-compression of the refrigerant is suitably reduced, the secondary discharge port 431 is omitted. However, in order to minimize an amount of the over-compression of compressed refrigerant, the secondary discharge port 431 may be defined in the front of the primary discharge port 421, that is, at a more upstream location in the compression progressing direction than the primary discharge port 421.

The roller 340 may be rotatably provided in the compressing space 333 in the cylinder 330.

The outer circumferential face 341 of the roller 340 is formed in a circular shape. The roller 340 is integrally coupled, at a center thereof, with the rotatable shaft 230. Accordingly, the roller 340 has a center Or coinciding with an axial center of the rotatable shaft 230. The roller 340 may rotate together with the rotatable shaft 230 around the center Or of the roller.

The center Or of the roller 340 does not coincide with the center Oc of the cylinder 330, that is, the center of the inner space of the cylinder 330.

A portion of the outer circumferential face 341 of the roller 340 is substantially in contact with a portion of the inner circumferential face 332 of the cylinder 330.

Hereinafter, a point of the cylinder 330 which is in substantial contact with a point of the roller 340 is referred to as a first contact point P1.

In this connection, a first center line L1 passing through the first contact point P1 and the center Oc of the cylinder 330 may correspond to a short axis of an elliptic curve defining the inner circumferential face 332 of the cylinder 330. Further, a second center line L2 is perpendicular to the first center line L1 and passes through the center of the cylinder 330. In this case, the inner circumferential face 332 of the cylinder 330 may be divided into 4 sections via the first center line L1 and the second center line L2. In this case, the 4 sections may be defined asymmetrically.

A plurality of vane-receiving slots 342 may be arranged along the circumferential direction and defined within the outer circumferential face portion 341 of the roller 340. Vanes 351, 352, and 353 are slidably received in the plurality of vane-receiving slots 342, respectively.

Each of the vane-receiving slots 342 may extend radially from the center of the roller 340. However, in this case, it is difficult to secure sufficient lengths of the vanes 351, 352, and 353. In this connection, the radial direction means the direction extending outward from the center of the roller 340.

In one embodiment, the vane-receiving slot 342 extends obliquely by a predetermined angle of inclination with respect to the radial direction. Thereby, a sufficient length of each of the vanes 351, 352, and 353 may be ensured.

In this connection, the directions in which the vanes 351, 352 and 353 are tilted may correspond to the rotating direction of the roller 340. This is because as the distal ends of the vanes 351, 352 and 353 as coupled to the inner circumferential face 332 of the cylinder 330 are tilted toward the rotational direction of the roller 340, the compression may be started quickly.

Further, in the inner-most end of each of the vane-receiving slot 342, each backpressure chamber 343 may be defined. Each backpressure chamber 343 allows oil or refrigerant to be introduced into the rear region of each of the vanes 351, 352 and 353 so that each of the vanes 351, 352 and 353 may be pressed toward the inner circumferential face of the cylinder 330.

Each backpressure chamber 343 is sealed by the primary lateral block 310 and the secondary lateral block 320. Each of the backpressure chambers 343 may communicate with each backpressure channel (not shown) independently. However, the present disclosure is not limited thereto. A plurality of backpressure chambers 343 may communicate with a common single backpressure flow path (not shown).

Hereinafter, the vanes 351, 352, and 353 are referred to as a first vane 351, a second vane 352, and a third vane 353, starting at the first contact point P1 and in this order along the compression progressing direction.

A first spacing between the first vane 351 and the second vane 352, a second spacing between the second vane 352 and the third vane 353, and a third spacing between the third vane 353 and the first vane 351 all have the same circumferential angle.

Thus, a compression sub-chamber defined by the third vane 353 and first vane 351 is referred to as first compression sub-chamber 333a; a compression sub-chamber defined by first vane 351 and second vane 352 is referred to as a second compression sub-chamber 333b; and a compression sub-chamber defined by the second vane 352 and the third vane 353 is referred to as a third compression sub-chamber 333c. In this case, all of the compression sub-chambers 333a, 333b, and 333c have the same volume at the same crank angle.

However, the present disclosure is not limited thereto. The compression sub-chambers 333a, 333b, and 333c may have different volumes. Hereinafter, the present invention will be described based on an example in which the compression sub-chambers 333a, 333b, and 333c have the same volume.

Each of the vanes 351, 352 and 353 may be formed in a substantially rectangular parallelepiped shape.

In this connection, the vanes 351, 352 and 353 each have both longitudinal ends. The longitudinal end tangent to the inner circumferential face 332 of the cylinder 330 is referred to as a most-outer end of the vane. The longitudinal end facing the backpressure chamber 343 is referred to as a most-inner end of the vane.

Each of the most-outer ends of the vanes 351, 352 and 353 has a curved shape so as to be in line-contact with the inner circumferential face 332 of the cylinder 330.

The most-inner ends of the vanes 351, 352 and 353 may be formed in a plane shape. Thus, the most-inner end of each of the vanes 351, 352 and 353 may be inserted into the backpressure chamber 343 and may be subjected to an uniform backpressure therein.

When a power is applied to the drive motor 200, the rotor 220 and the rotatable shaft 230 coupled to the rotor 220 are rotated together. The roller 340 rotates together with the rotatable shaft 230.

Then, the centrifugal force generated by the rotation of the roller 340 and the backpressure acting on the most-inner ends of the vanes 351, 352 and 353 may allow the vanes 351, 352 and 353 to be respectively inserted into or withdrawn from the vane-receiving slots 342. Thus, the most-outer end of each of the vanes 351, 352 and 353 contacts the inner circumferential face 332 of the cylinder 330.

In this regard, the compressing space 333 of the cylinder 330 is partitioned into compression sub-chambers 333a, 333b, 333c having a number corresponding to the number of vanes 351, 352 and 353 by the number of the vanes 351, 352 and 353.

Each compression sub-chamber 333a, 333b, and 333c moves along the rotation of the roller 340. During this movement, the volume of each compression sub-chamber 333a, 333b, and 333c may vary due to the non-symmetrical sections of the inner circumferential face 332 of the cylinder 330 and the non-concentricity of the roller 340. Accordingly, the refrigerant filled in each of the compression sub-chambers 333a, 333b and 333c may be sucked, compressed and discharged while moving along the roller 340 and the vanes 351, 352 and 353.

Specific operations of the compressing unit 300 will be described below.

First, referring to the first compression sub-chamber 333a, the volume of the first compression sub-chamber 333a is continuously increased until the first vane 351 passes by the suction port 334 and the third vane 353 reaches a suction completion temporal point. Thus, the refrigerant continuously flows from the suction port 334 to the first compression sub-chamber 333a.

Then, when the third vane 353 reaches the suction completion temporal point, or a compression start angle, the first compression sub-chamber 333a comes into a sealed state. Then, the first compression sub-chamber 333a moves along with the roller 340 toward the discharge port. In this process, the volume of the first compression sub-chamber 333a is continuously decreased. Thereby, the refrigerant in the first compression sub-chamber 333a is gradually compressed.

Then, When the first vane 351 passes by the secondary discharge port 431, and the third vane 353 does not reach the secondary discharge port 431, some of the refrigerant in the first compression sub-chamber 333a is discharged through the secondary discharge port 431 to the inner space 110 of the casing 100. In this connection, the pressure of the first compression sub-chamber 333a is lowered to a predetermined pressure.

If there is no secondary discharge port 431, the refrigerant in the first compression sub-chamber 333a is not discharged, but moves further toward the primary discharge port 421.

Then, when the first vane 351 passes by the primary discharge port 421 and the third vane 353 reaches the discharge start position, the refrigerant in the first compression sub-chamber 333a is discharged to the inner space 110 of the casing 100 through the second discharge port 336b.

The above-described series of phases may be equally applied to the second compression sub-chamber 333b between the first vane 351 and the second vane 352, and the third compression sub-chamber 333c between the second vane 352 and the third vane 353.

Figure 3:
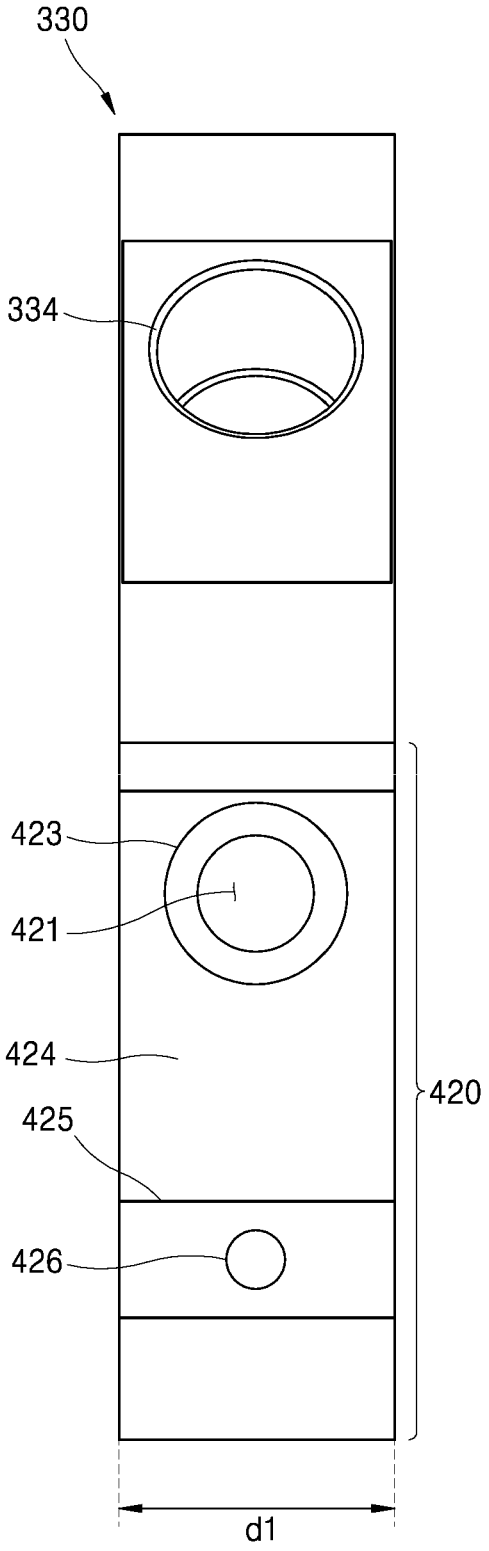
FIG. 3 shows a side elevation view of the cylinder included in the compressor of FIG. 1.
Figure 4:
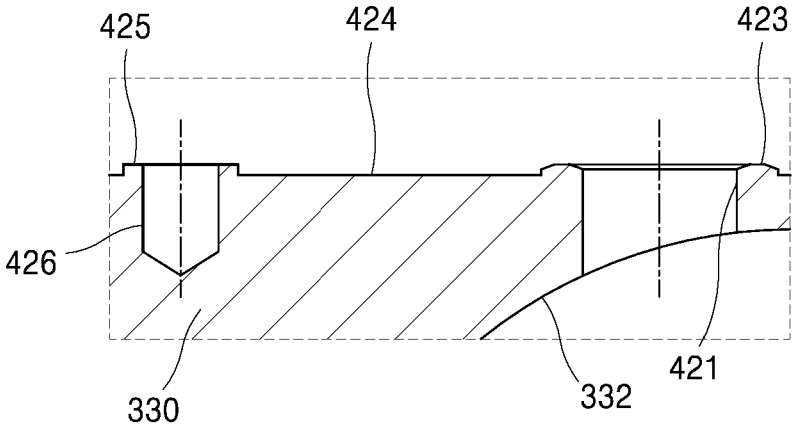
FIG. 4 is an enlarged view of a S region of FIG. 2.

FIG. 3 is a side elevation view of the cylinder included in the compressor of FIG. 1. FIG. 4 is an enlarged view of a S region of FIG. 2.

Referring to FIG. 3 and FIG. 4, a first valve-recess 420 and a second valve-recess 430 may be defined in the outer circumferential face portion of the cylinder 330 according to an embodiment of the present disclosure. The first valve-recess 420 may be disposed closer to the suction port 334 than the second valve-recess 430.

In this connection, the first valve-recess 420 has substantially the same structure as the second valve-recess 430. Accordingly, only the first valve-recess 420 will be described below.

The outer face portion of the cylinder defining the first valve-recess 420 may include a valve-seated flat portion 424, a step portion 425, a rounded portion 423, and a discharge port 421.

The valve-seated flat portion 424 defines a portion of the outer circumferential face portion of the cylinder 330. The valve-seated flat portion 424 may be a planar portion extending in the inner center direction of the cylinder 330.

The valve-seated flat portion 424 is outwardly adjacent to the step portion 425. The step portion protrudes. The valve-seated flat portion 424 is inwardly adjacent to the rounded portion 423. The rounded portion 423 protrudes. In this connection, the height of the step portion 425 and the height of the rounded portion 423 as measured from the top face of the valve-seated flat portion 424 may be equal to each other.

As used herein, the valve-seated flat portion 424, the step portion 425, and the rounded portion 423 together define a bottom face of the groove 430.

The outer face portion of the cylinder defining the first valve-recess 420 may further include a side-wall portion 427. The side-wall portion 427 may define a side wall face of the groove 430. The side-wall portion 427 extends inwardly of the cylinder 330 with a predetermined angle with the valve-seated flat portion 424. In FIG. 2, although an angle defined by the valve-seated flat portion 424 and the side-wall portion 427 is illustrated as an obtuse angle, that is, an angle of 90 degrees to 180 degrees exclusive, the present disclosure is not limited thereto. In another embodiment, the angle defined by the valve-seated flat portion 424 and the side-wall portion 427 may be an acute angle, that is, an angle of 0 degree exclusive to 90 degrees.

The step portion 425 may protrude from the top face of the valve-seated flat portion 424. The step portion 425 may protrude in a direction perpendicular to the valve-seated flat portion 424. However, the present disclosure is not limited thereto. A joint portion between the step portion 425 and the valve-seated flat portion 424 may have a rounded or sloped shape.

One end of the discharge valve assembly (500 in FIG. 5) to be described later may be fixed to the step portion 425.

At the center of the step portion 425, a pin-receiving groove 426 for receiving one end of the discharge valve assembly 500 may be defined in the step portion. The pin-receiving groove 426 may be defined to have a predetermined depth inwardly of the cylinder 330. The depth of the pin-receiving groove 426 may be arbitrarily defined.

The pin-receiving groove 426 may be shaped to correspond to a shape of a fixing-pin 530 included in the discharge valve assembly 500 (FIG. 5). Thus, the pin 530 may be fit into the groove 426. A detailed description thereof will be given later with reference to FIG. 5.

The rounded portion 423 protrudes from the valve-seated flat portion 424 so as to surround the outer circumference of the discharge port 421. The rounded portion 423 may include a convex center and both rounded or curved edges so that the contact area between the rounded portion 423 and the discharge valve assembly (500 in FIG. 5) is minimized. The rounded portion 423 may be formed in a donut shape such that the rounded portion 423 surrounds the outer circumference of the discharge port 421.

The rounded portion 423 may be spaced apart from the step portion 425 via the valve-seated flat portion 424.

Further, a maximum height of the rounded portion 423 as measured from the top face of the valve-seated flat portion 424 may be equal to the maximum height of the step portion 425 as measured from the top face of the valve-seated flat portion 424. Thus, when the bottom face of the discharge valve assembly (510 in FIG. 5) contacts the rounded portion 423, the discharge valve assembly (500 in FIG. 5) may be oriented parallel to the valve-seated flat portion 424. Further, the discharge valve assembly (500 in FIG. 5) may be spaced apart from the valve-seated flat portion 424.

According to an embodiment of the present disclosure, due to the first valve-recess 420, the oil-blocking structure formed on the outer face of the conventional cylinder may be absent.

Accordingly, a vertical first height dl of the cylinder 330 measured in the direction in which the rotatable shaft 230 extends may be equal to a second vertical height dl (refer to FIG. 3) of the first valve-recess 420. That is, the second vertical height dl (refer to FIG. 3) of the first valve-recess 420 may be a width of the first valve-recess 420. The vertical first height dl of the cylinder 330 may be a thickness of the cylinder 330, not a radial thickness of the cylinder 330. An oil-blocking structure is not formed on the cylinder 330. Thus, the upper end of the valve-seated flat portion 424 may contact the primary lateral block 310 while the lower end of the valve-seated flat portion 424 may contact the secondary lateral block 320.

Further, an oil-blocking structure existing on the outer surface of the cylinder 330 in the prior art is not formed in the present invention. Thus, it may be easier to define the rounded portion 423 in the outer face portion of the cylinder 330. When the oil-blocking structure is present, to form a structure having the same shape as the rounded portion 423 due to the machining property of the cylinder 330 may be difficult and may take a long time.

In contrast, the first valve-recess 420 is defined in the outer face portion of the cylinder 330 according to the embodiment of the present disclosure. The valve-recess has at least one side face open to the outside. Thus, the rounded portion 423 protruding from the valve-seated flat portion 424 may be easily formed. Thus, the cost and time required for machining the rounded portion 423 may be saved.

Further, the rounded portion 423 reduces the oil stiction occurring between the discharge port 421 and the discharge valve assembly (500 in FIG. 5). Thus, it is possible to reduce the power loss due to over-compression of the compressing unit 300. As a result, the overall efficiency of the compressor may be improved.

Figure 6:
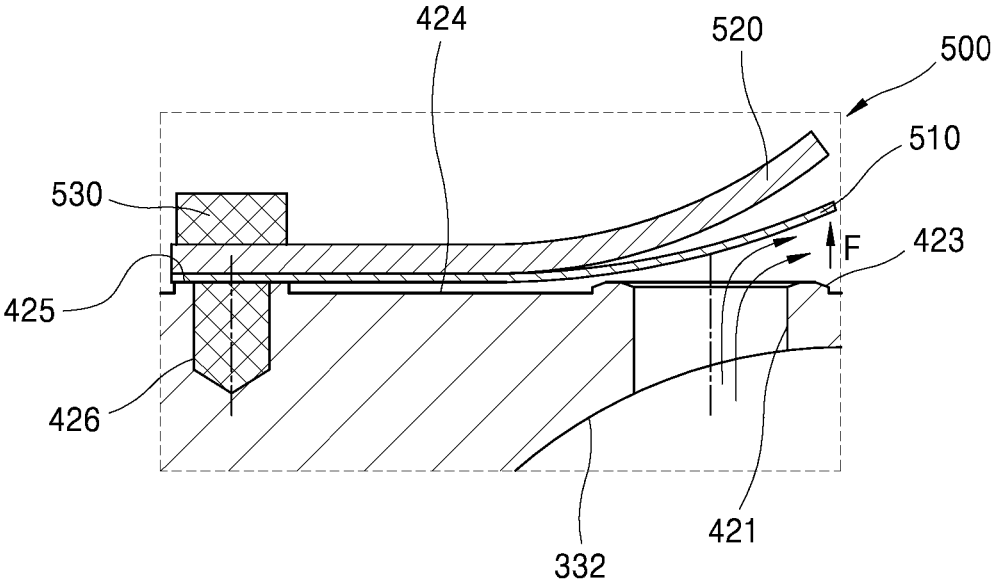
FIG. 6 shows an operation of the discharge valve assembly of FIG. 5.

FIG. 5 shows the discharge valve assembly coupled to the cylinder of FIG. 4. FIG. 6 shows the operation of the discharge valve assembly of FIG. 5.

Referring to FIGS. 5 and 6, the discharge valve assembly 500 disposed in the first valve-recess 420 includes a discharge valve 510, a valve support 520, and a fixing-pin 530.

The discharge valve 510 may have a flat plate shape. The discharge valve 510 may be made of a resilient metal material. However, the present disclosure is not limited thereto. One end of the discharge valve 510 is fixed to the step portion 425, while the other end of the valve 510 is positioned on the rounded portion 423. The other end of the value 519 acts as a free end, thereby groove and closing the discharge port 421.

Specifically, a bottom face of one end of the discharge valve 510 may be in contact with a top face of the step portion 425. A bottom face of the other end of the discharge valve 510 may touch a height point or face of the rounded portion 423. A middle region of the discharge valve 510 is spaced apart from the valve-seated flat portion 424.

In this connection, since the edge of the rounded portion 423 is rounded, the contact area between the discharge valve 510 and the rounded portion 423 can be minimized.

The contact area between discharge valve 510 and rounded portion 423 is related to oil stiction.

For example, when the contact area of the discharge valve 510 and the rounded portion 423 is large, the oil stiction due to oil is increased. Accordingly, the pressure of the compression chamber to allow groove the discharge valve 510 is increased. Thus, over-compression occurs in the compression chamber. When this over-compression occurs, the compression loss may occur and thus the compression efficiency of the compressor may be reduced.

On the other hand, when the contact area between the discharge valve 510 and the rounded portion 423 is small, the oil stiction due to the oil is reduced. Thus, the power loss due to over-compression may be reduced and, hence, the compression efficiency may be increased.

The valve support 520 may be provided on the discharge valve 510.

One end of the valve support 520 is fixed to the step portion 425. As the valve support 520 extends from the step portion to the rounded portion, the valve support 520 may be spaced farther away from the valve-seated flat portion 424, that is, the valve support 520 may be bent upward.

A bottom face of the valve support 520 at one end thereof is in contact with the top face of the discharge valve 510, while a bottom face of the valve support 520 at the other end thereof is spaced apart from the discharge valve 510.

The valve support 520 serves as a stopper for the discharge valve 510 so that the discharge valve 510 is not bent beyond a predetermined angle. Thus, the thickness of the valve support 520 is larger than the thickness of the discharge valve 510.

Further, the valve support 520 may include a rigid material that is more rigid than the discharge valve 510. However, the present disclosure is not limited to this.

The fixing-pin 530 may secure one end of the discharge valve 510 and one end of the valve support 520 to the step portion 425. The fixing-pin 530 may be formed in a shape engageable with the pin-receiving groove 426 defined in the step portion 425.

The fixing pin 530 has the same outer circumferential shape as the inner circumferential face of the pin-receiving groove 426. Thereby, the pin may fit into the pin-receiving groove 426.

Referring to FIG. 6, a bottom face of the other end of the discharge valve 510 may contact the top of the rounded portion 423 or the height point of rounded portion 423.

Then, when the pressure in the compression chamber communicated with the discharge port 421 is increased, the discharge valve 510 is subjected to an upward force F, and is bent to approach the valve support 520.

Accordingly, the refrigerant compressed in the compression sub-chamber communicated with the discharge port 421 is discharged into a space between the discharge valve 510 and the discharge port 421 and, then, is moved to an inner upper region of the casing 100.

Figure 7:
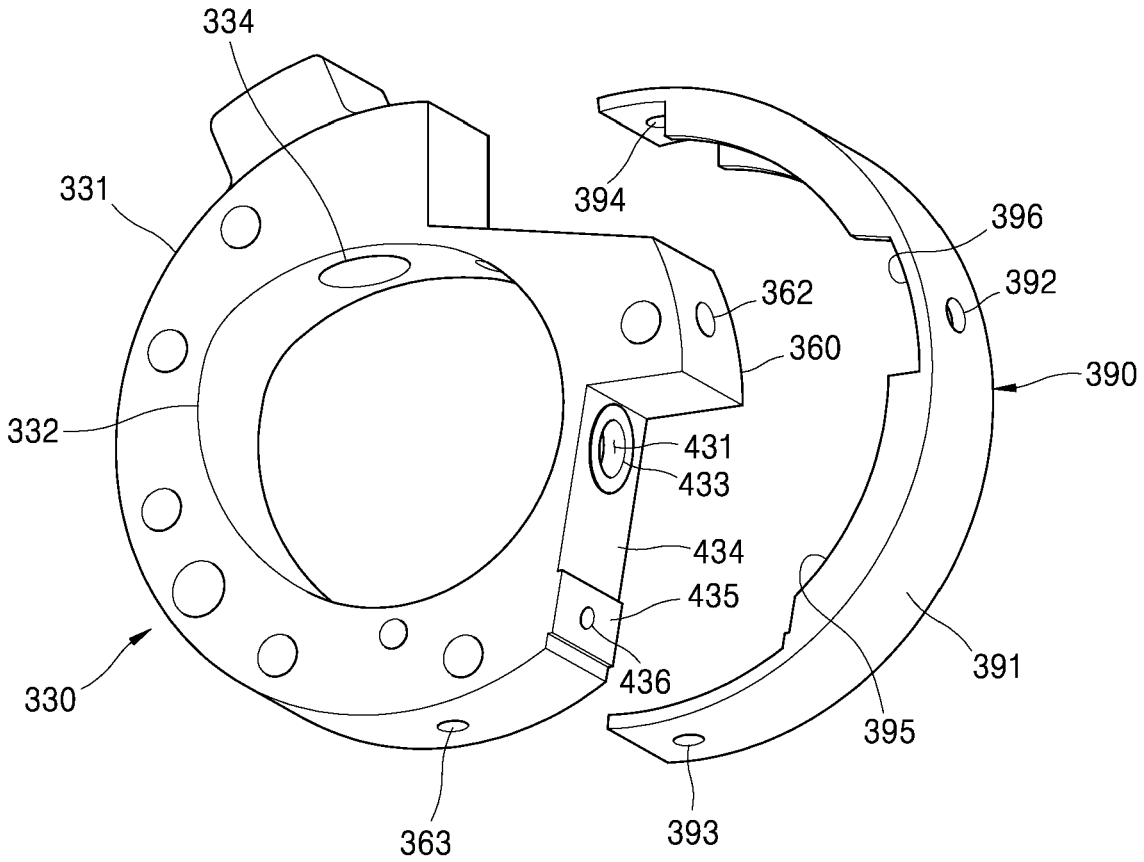
FIG. 7 and FIG. 8 are illustrations of a valve-recess cover coupled to the cylinder of FIG. 2.
Figure 8:
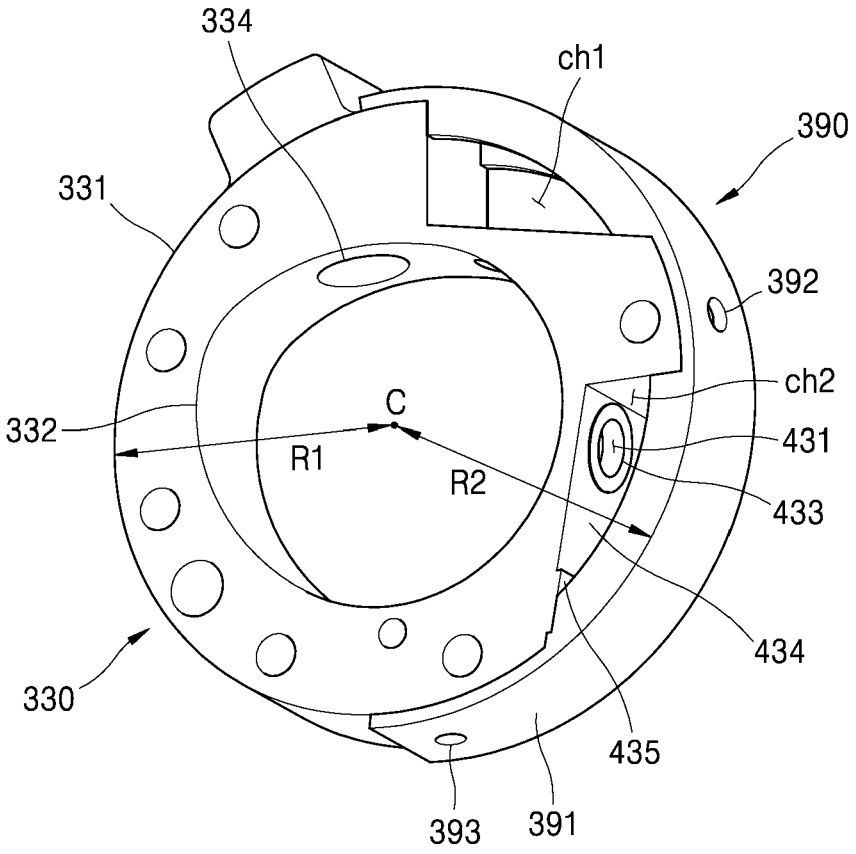

FIG. 7 and FIG. 8 show a valve-recess cover attached to the cylinder of FIG. 2.

For reference, FIG. 7 and FIG. 8 illustrate a valve-recess cover 390 that may be mated with the cylinder 330 as described previously. Thus, a redundant description of the cylinder 330 as described above will be omitted below.

The valve-recess cover 390 covers the first valve-recess 420 and the second valve-recess 430 defined in the cylinder 330, and is removably coupled to the cylinder 330.

Specifically, an outer circumferential face of the valve-recess cover 390 has the same curvature center C as the outer circumferential face of the cylinder 330. In this connection, the center of curvature C may be a point at a distance equal to a radius of curvature from any point on a circular curve in a normal direction to the curve at the point on the curve. Further, the radius of curvature means a radius of a circular arc forming a curved face or a curved line.

In this connection, the curvature radius R2 of the valve-recess cover 390 may be different from the curvature radius R1 of the cylinder 330. For example, the curvature radius R2 of the valve-recess cover 390 may be greater than the radius of curvature R1 of the cylinder 330.

However, the present disclosure is not limited thereto. the curvature radius R2 of the valve-recess cover 390 may be equal to the radius of curvature R1 of the cylinder 330. In this case, unlike the embodiment illustrated in the figure, the outer circumferential face of the valve-recess cover 390 and the outer circumferential face of the cylinder 330 together define a continuous curved face that does not have a step portion.

The valve-recess cover 390 covers both the first valve-recess 420 and the second valve-recess 430. The inner circumferential face 395 of the cover 390 partially overlaps the outer circumferential face of the cylinder.

Further, at a middle location of the inner circumferential face 395 of the valve-recess cover 390, a groove 396 may be defined in the inner circumferential face 395.

The inner circumferential face of the groove 396 corresponds to an outer circumferential face of a protrusion 360 located between the first valve-recess 420 and the second valve-recess 430.

A first opening 362 is defined in the protrusion 360 located between the first valve-recess 420 and the second valve-recess 430. A through-hole 392 is defined at a position of the outer circumferential face of the valve-recess cover 390, corresponding to a position of the first opening 362. The first opening 362 and the through-hole 392 may overlap with each other. A fastening member (not shown) such as a bolt or an engagement pin may pass through the first opening 362 and the through-hole 392 and fasten them to each other.

However, the present disclosure is not limited thereto. The valve-recess cover 390 may have an engaged portion (not shown) formed on the inner face of the cover to be engaged with the first opening 362.

Similarly, an opening 363 may be defined in the outer circumferential face portion of the cylinder 330. A through-hole 393 may be defined in the valve-recess cover 390 to position-correspond to the opening 363. However, the present disclosure is not limited thereto. The components 363 and 393 may be omitted.

As the valve-recess cover 390 is coupled to the cylinder 330, discharge chambers Ch1 and Ch2 may be defined respectively between the outer face of the cylinder defining the first valve-recess 420 and the valve-recess cover 390, and between the outer face of the cylinder defining the second valve-recess 430 and the valve-recess cover 390.

In this connection, the discharge chambers Ch1 and Ch2 may be defined between the outer face of the cylinder defining the first valve-recess 420, the outer face of the cylinder defining the second valve-recess 430, the inner circumferential face of the valve-recess cover 390, the primary lateral block 310, and the secondary lateral block 320.

The compressed refrigerant as discharged into the discharge chambers Ch1 and Ch2 may be discharged to an upper region of the casing 100 through a refrigerant channel (312 in FIG. 1) defined above the primary lateral block 310.

However, the present disclosure is not limited thereto. The compressed refrigerant may be discharged into the casing 100 through a separate refrigerant channel communicating with the discharge chambers Ch1 and Ch2 and, then, may be discharged to the outside through the discharge tube 130.

The combination of the valve-recess cover 390 and the cylinder 330 may keep the discharge chambers Ch1 and Ch2 in an air-tight state to prevent the inflow of external oil into the discharge chambers Ch1 and Ch2. If oil seeps into the discharge ports 421 and 431, the refrigerant discharged through the discharge ports 421 and 431 may not be smoothly discharged to the outside.

That is, the oil-blocking structure existing on the outer circumferential surface of the cylinder 330 in the prior art is removed according to the present invention. As a result, oil inflow into the discharge chambers Ch1 and Ch2 may occur. However, this may be prevented by coupling the valve-recess cover 390 into the cylinder 330.

Thus, in the compressor according to an embodiment of the present disclosure, the compressed refrigerant may be smoothly discharged to the outside by coupling the valve-recess cover 390 on the outer face of the cylinder 330.

In the above description, numerous specific details are set forth in order to provide a thorough understanding of the present disclosure. The present disclosure may be practiced without some or all of these specific details. Examples of various embodiments have been illustrated and described above. It will be understood that the description herein is not intended to limit the claims to the specific embodiments described. On the contrary, it is intended to cover alternatives, modifications, and equivalents as may be included within the spirit and scope of the present disclosure as defined by the appended claims.

What is claimed is:

1. A compressor, comprising:

a cylinder including a compression chamber, a suction port, and a discharge port opposite to the suction port;

a roller disposed in the compression chamber, the roller being eccentric with respect to an inner circumferential face of the cylinder and being configured to rotate within the cylinder;

a plurality of vanes moveably inserted in the roller, the vanes being configured to move toward *or away from* the inner circumferential face of the cylinder and to divide the compression chamber into a plurality of compression sub-chambers;

[at least one] *a* valve-recess defined in an outer face portion of the cylinder;

a discharge valve assembly [fixedly received in] *attached to* the valve-recess, the discharge valve assembly being configured to open and to close the discharge port; and a valve-recess cover coupled to the cylinder to cover the valve-recess, [the cover including a curvature center coinciding with a curvature center of the cylinder,] *the cover having a first end and a second end spaced from the first end in a circumferential direction,* wherein [the outer face portion of the cylinder defining] the valve-recess includes:

a valve-seated portion;

a step portion protruding from the valve-seated portion, one end of the discharge valve assembly being attached to the step portion; and a rounded portion surrounding the discharge port, the rounded portion protruding from the valve-seated portion.

2. The compressor of claim 1, wherein a height of the step portion relative to the valve-seated portion is equal to a height of the rounded portion relative to the valve-seated portion.

3. The compressor of claim 1, wherein the discharge valve assembly includes:

a discharge valve, a first end of the discharge valve attached to the step portion and a free end of the discharge valve positioned above the rounded portion, the free end being movable to open or close the discharge port;

a valve support disposed on the discharge valve, a first end of the valve support attached to the step portion, a spacing between the valve support and a bottom face of the valve-recess increasing along a length of the valve support extending between the step portion and the rounded portion; and a fixing-pin that attaches the discharge valve and the valve support to the step portion.

4. The compressor of claim 3, wherein the rounded portion includes a central convex portion located between adjacent rounded edge portions.

5. The compressor of claim 3, wherein the step portion includes a pin-receiving opening.

6. The compressor of claim 1, wherein a radius of curvature of the cylinder differs from a radius of curvature of the valve-recess cover.

7. The compressor of claim 1, wherein the discharge port is a first discharge port and the cylinder includes a second discharge port spaced from the first discharge port, and wherein the [at least one] valve-recess includes *a* first-*valve-recess* and *a* second [valve-recesses] *valve-recess* fluidly coupled with the first and second discharge ports, respectively.

8. The compressor of claim 7, wherein the valve-seated portion includes first and second valve-seated portions, the first valve-seated portion includes the first valve-recess, the second valve-seated portion includes the second valve-recess, and the first valve-seated portion is disposed at an angle relative to [an extension direction of] the second valve-seated portion.

9. The compressor of claim 7, wherein the cylinder includes a protrusion formed between the first valve-recess and the second valve-recess, and the cover is coupled to the cylinder such that an inner circumferential face of the cover contacts the protrusion and both opposite outer circumferential ends of the cylinder.

10. The compressor of claim 9, wherein the valve-recess cover includes:

an inner circumferential face portion; and a groove in the inner circumferential face portion, the protrusion being configured to be received in the groove.

11. A compressor, comprising:

a cylinder including a compression chamber, a suction port and a discharge port opposite to the suction port;

a roller disposed in the compression chamber, the roller being eccentric with respect to an inner circumferential face of the cylinder and being configured to rotate within the cylinder;

a plurality of vanes moveably inserted in the roller, the vanes being configured to move toward *or away from* the inner circumferential face of the cylinder and to divide the compression chamber into a plurality of compression sub-chambers;

[at least one] *a* valve-recess defined in an outer face portion of the cylinder, the valve-recess fluidly coupled with the discharge port;

a discharge valve assembly [fixedly received in] *attached to* the valve-recess, the discharge valve assembly being configured to open and close the discharge port; and a valve-recess cover coupled to the cylinder to cover the valve-recess, [the cover including a curvature center coinciding with a curvature center of the cylinder,]

wherein the discharge port is a first discharge port and the cylinder includes a second discharge port spaced from the first discharge port,

[the at least one valve-recess includes first and second valve-recesses fluidly coupled with the first and second discharge ports respectively,]

the cylinder includes a protrusion between the [first valve-recess and the second valve-recess] *first discharge port and the second discharge port*, and an inner circumferential face of the cover contacts the protrusion,

*wherein the valve-recess cover includes:*

*an inner circumferential face portion; and*

*a groove in the inner circumferential face portion, the protrusion being configured to be received in the groove.*

12. The compressor of claim 11, wherein a radius of curvature of the cylinder differs from a radius of curvature of the valve-recess cover.

13. The compressor of claim 11, wherein [the outer face portion of the cylinder defining] the valve-recess includes:

a valve-seated portion;

a step portion protruding from the valve-seated portion, one end of the discharge valve assembly being attached to the step portion; and a rounded portion surrounding the discharge port, the rounded portion protruding from the valve-seated portion.

14. The compressor of claim 13, wherein a height of the step portion relative to the valve-seated portion is equal to a height of the rounded portion relative to the valve-seated portion.

[15. The compressor of claim 11, wherein the valve-recess cover includes:

an inner circumferential face portion; and a groove in the inner circumferential face portion, the protrusion being configured to be received in the groove.]

[16. A compressor comprising:

a casing;

a drive motor housed in the casing;

a rotatable shaft disposed within the casing;

a primary side block housed in and fixed to the casing;

a secondary side block spaced apart from the primary side block, the primary side block and the secondary side block surrounding the rotatable shaft;

a cylinder interposed between and attached to the primary and secondary side blocks, the cylinder including a compression chamber, a suction port and at least one discharge port opposite to the suction port;

a roller attached to the rotatable shaft and disposed in the compression chamber, the roller being eccentric with respect to an inner circumferential face of the cylinder, and being configured to rotate within the cylinder;

a plurality of slots in the roller;

a plurality of vanes moveably inserted in the slots, the vanes being configured to move toward the inner circumferential face of the cylinder and to divide the compression chamber into a plurality of compression sub-chambers;

at least one valve-recess defined in an outer face portion of the cylinder;

a discharge valve assembly fixedly received in the valve-recess, the discharge valve assembly being configured to open and close the discharge port;

a valve-recess cover coupled to the cylinder to cover the valve-recess, the cover including a curvature center coinciding with a curvature center of the cylinder; and a discharge chamber being defined by the outer face of the cylinder, an inner circumferential face of the cover, and the primary and secondary side blocks, wherein the discharge chamber is configured to discharge compressed refrigerant through a refrigerant channel into an inner space in the casing, wherein the valve-recess is defined by an outer face of the cylinder, and the primary and secondary side blocks, the discharge port is a first discharge port and the cylinder includes a second discharge port spaced from the first discharge port, the at least one valve-recess includes first and second valve-recesses fluidly coupled with the first and second discharge ports respectively, the cylinder includes a protrusion between the first valve-recess and the second valve-recess, and an inner circumferential face of the cover contacts the protrusion.]

[17. The compressor of claim 16, wherein the rotatable shaft extends in a first direction and a dimension of the valve-recess in the first direction is equal to a dimension of the cylinder in the first direction.]

*18. The compressor of claim 1, the cover including a curvature center coinciding with a curvature center of the cylinder.*

*19. The compressor of claim 11, the cover including a curvature center coinciding with a curvature center of the cylinder.*

*20. The compressor of claim 11, wherein the valve-recess includes a first valve-recess and a second valve-recess fluidly coupled with the first and second discharge ports respectively, and*

*wherein the protrusion is between the first valve-recess and the second valve-recess.*

* * * * *